(12) United States Patent
Ferry

(10) Patent No.: US 6,196,463 B1
(45) Date of Patent: Mar. 6, 2001

(54) CARD READER

(75) Inventor: Thomas S. Ferry, Angus (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/231,497

(22) Filed: Jan. 14, 1999

(30) Foreign Application Priority Data

Mar. 26, 1998 (GB) .................................................. 9806434

(51) Int. Cl.⁷ .................................................. G06K 13/00
(52) U.S. Cl. .......................................... 235/475; 235/380
(58) Field of Search ............................ 194/203; 235/475, 235/380

(56) References Cited

U.S. PATENT DOCUMENTS 5,547,061   8/1996  Itako et al. .
5,828,043 * 10/1998  Nicoil et al. ......................... 235/380

FOREIGN PATENT DOCUMENTS

| 0454570 | 10/1991 | (EP) . |
| 0784284 | of 1997 | (EP) . |
| 2646261 | 10/1990 | (FR) . |
| 2703486 | 10/1994 | (FR) . |
| 2703487 | 10/1994 | (FR) . |
| 2246462 | 1/1992  | (GB) . |
| 9829514 | 7/1998  | (WO) . |

OTHER PUBLICATIONS

Database WPI, Section Ch, Week 199719, Derwent Publications Ltd. London, GB, Class D22, AN 1997–209200, XP002133160 & JP 09 059128 A (Japan Vilene Co Ltd), (Mar. 4, 1997).

Database WPI, Week 8439, Derwent Publications Ltd., London, GB; Class 23, AN 84–241316, XP 002133161 & JP 59 145263 A (Mitsushita Elec Co Ltd), ( Aug. 20, 1984).

Database WPI, Section Ch, Week 199127, Derwent Publications Ltd., London, GB; Class A97, AN 1991–196913, XP002133162 & JP 03 121169 A (Okubo K),( May 23, 1991).

* cited by examiner

Primary Examiner—Harold I. Pitts
(74) Attorney, Agent, or Firm—Francis L. Conte

(57) ABSTRACT

The invention provides for a card reader, and a self-service terminal employing the same, the reader comprising a card receiving means for receiving a card having stored data to be read and card reading means for reading the stored data, the reader being arranged to deliver a card received at the card receiving means to the card reading means via a delivery path, and including a signal source arranged to provide an output signal that can cover the complete width of the path, and detecting means arranged to receive the output signal and serving to detect the presence of an object in the path in response to the object interfering with the signal.

20 Claims, 4 Drawing Sheets

CARD READER

BACKGROUND OF THE INVENTION

The present invention relates to a card reader for receiving a card carrying stored data for the subsequent reading of the said data and, relates particularly, but not exclusively, to a magnetic card reader such as that employed in an Automated Teller Machine (ATM).

Self-service financial terminals such as ATMs are commonly arranged to receive a card having magnetically stored data which can be employed to verify the identity of an individual accessing the self-service terminal. However, the requirement for using such a card does not prevent attempted fraud or other erroneous, or inappropriate, operation of the self-service terminal.

SUMMARY OF THE INVENTION

The present invention seeks to provide for a card reader such as the type that might be employed in a self-service terminal and which exhibits advantages over known such card readers in reducing the likelihood of fraudulent operation of the terminal.

According to the present invention there is provided a card reader comprising a card receiving means for receiving a card having stored data to be read and card reading means for reading the stored data, the reader being arranged to deliver a card received at the card receiving means to the card reading means via a delivery path, characterized by a signal source for providing an output signal arranged to be directed across the complete width and height of the path, and detecting means arranged to receive the said output signal so swept and serving to detect the presence of an object in the path in response to the object interfering with the signal.

The invention is advantageous in that any fraud that might involve the insertion of objects other than the card to be read into the card reader of the self-service terminal can be readily identified irrespective of the shape, configuration and/or dimensions of the object. Thus, a variety of attempted frauds involving the insertion of a "foreign" object into the card reader can be prevented.

In one particular embodiment of the present invention, the detecting means comprises a receiver located on a side of the path opposite to that at which the signal source is located.

In an alternative embodiment, both the signal source and the receiver are located on the same side of the delivery path and reflecting means is employed in order to reflect the signal from the signal source to the receiver. A particularly compact arrangement can be achieved in this manner.

According to a further advantage, both the signal source and the receiver can be commonly mounted such that any movement of the mount leads to equal movement of the signal sensor and the receiver.

Preferably, the signal source is movably mounted relative to the delivery path. In particular, the signal source can be arranged to be movable across the full extent of the delivery path.

Advantageously, the signal source is arranged to be moved across the delivery path under the control of a stepper motor.

A particularly compact, readily operable and accurate mounting and drive arrangement for the signal source can be achieved by mounting the signal source upon a threaded shaft arranged to be rotated under the control of the motor such as the aforementioned stepper motor. Movement of the signal source across the delivery path is therefore achieved by rotation of the shaft.

According to a particularly advantageous embodiment of the present invention, the signal source and receivers comprise appropriately matched electro-optic devices.

One example of such a signal source comprises a laser and the present invention can advantageously employ a laser inferometer for generating and monitoring the signal swept across the delivery path.

With such a movable signal source and receiver as outlined above, the reflecting means to be located on the mutually opposite side of the delivery path advantageously comprises an elongate reflector which extends parallel to the path of travel of the signal source during its movement across the delivery path so as to sweep the signal across the said path. In this manner, irrespective of the position of the signal source during its travel across the delivery path, a particularly compact reflector arrangement advantageously serves to return the signal to the receiver.

According to a further aspect of the present invention there is provided a self-service terminal comprising processor means, card input means, card reading means, data input means, display means, output means and connection means for connecting to a central authorization unit, characterized by a card reader arranged to deliver a card received at the card input means to the card reading means via a delivery path wherein a signal source is arranged to provide an output signal that is swept across the delivery path, and detecting means arranged to receive the signal so swept and serving to detect the presence of an object in the delivery path in response to the object interfering with the signal.

It should be appreciated that the present invention is particularly advantageous in detecting an object such as a thin or fine member in the form of a thread.

BRIEF DESCRIPTION OF THE DRAWINGS

The invention is described further hereinafter, by way of example only, with reference to the accompanying drawings in which.

DETAILED DESCRIPTION

Figure 1:
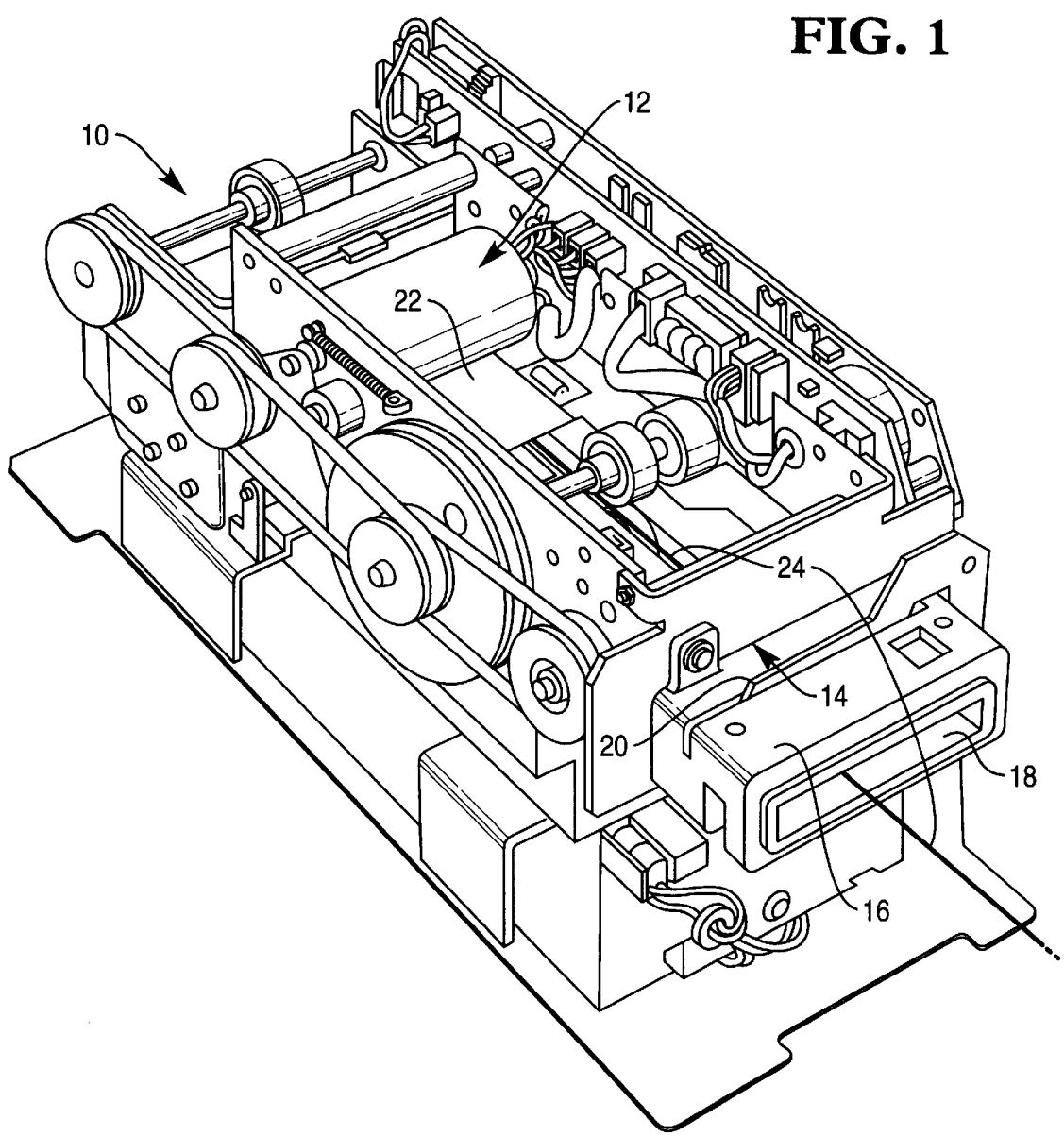
FIG. 1 is a perspective view of a known card reader with a card and a foreign object received therein.

In FIG. 1 a card reader 10, such as that currently employed in an ATM, comprises a data-reader section 12 to which a card having magnetically recorded data is delivered for the reading of the data therefrom as part of a user-verification procedure. The card reader has a mouth region 14 into which a card to be read is introduced by a user, and to which a card having been read is returned for retrieval by the user.

The mouth region 14 includes a throat portion 16 which presents a slot 18 of dimensions somewhat similar to the transverse cross section of the card and through which the card is delivered into the card reader 10 for subsequent delivery to the data reader region 12.

In order to prevent unwanted foreign bodies being introduced into the card reader via the slot 18, the throat portion 16 commonly employs a shutter arrangement 20 movable between first and second positions. In the first position the throat 16 defines an open passage for allowing delivery of a card introduced into the slot 18 into the card reader 10. In a second position, the shutter arrangement closes off the front of the slot 18 from the card reader 10.

Thus, the shutter arrangement 20 can serve to provide at least some limited form of fraud prevention.

However, the scope of fraud prevention is disadvantageously limited and FIG. 1 further illustrates one particular form of fraud to which the prior art arrangement is susceptible.

A card 22 having previously been introduced into the card reader 10 is illustrated at the location of the data reader region 12 and, as illustrated, a thread 24 secured to the card 22 by an adhesive or tape etc. extends back along the delivery path and out of the slot 18 for manipulation by a user attempting to execute a fraudulent activity. Although the shutter 20 is in its second, i.e. closed, position, the closed shutter is unable to prevent movement of the card within the reader which can be achieved by manipulation of the thread 24. The thread not only prevents retention of the card but also provides a means whereby the card can be moved relative to reading heads so as to generate a false reading.

Figure 2:
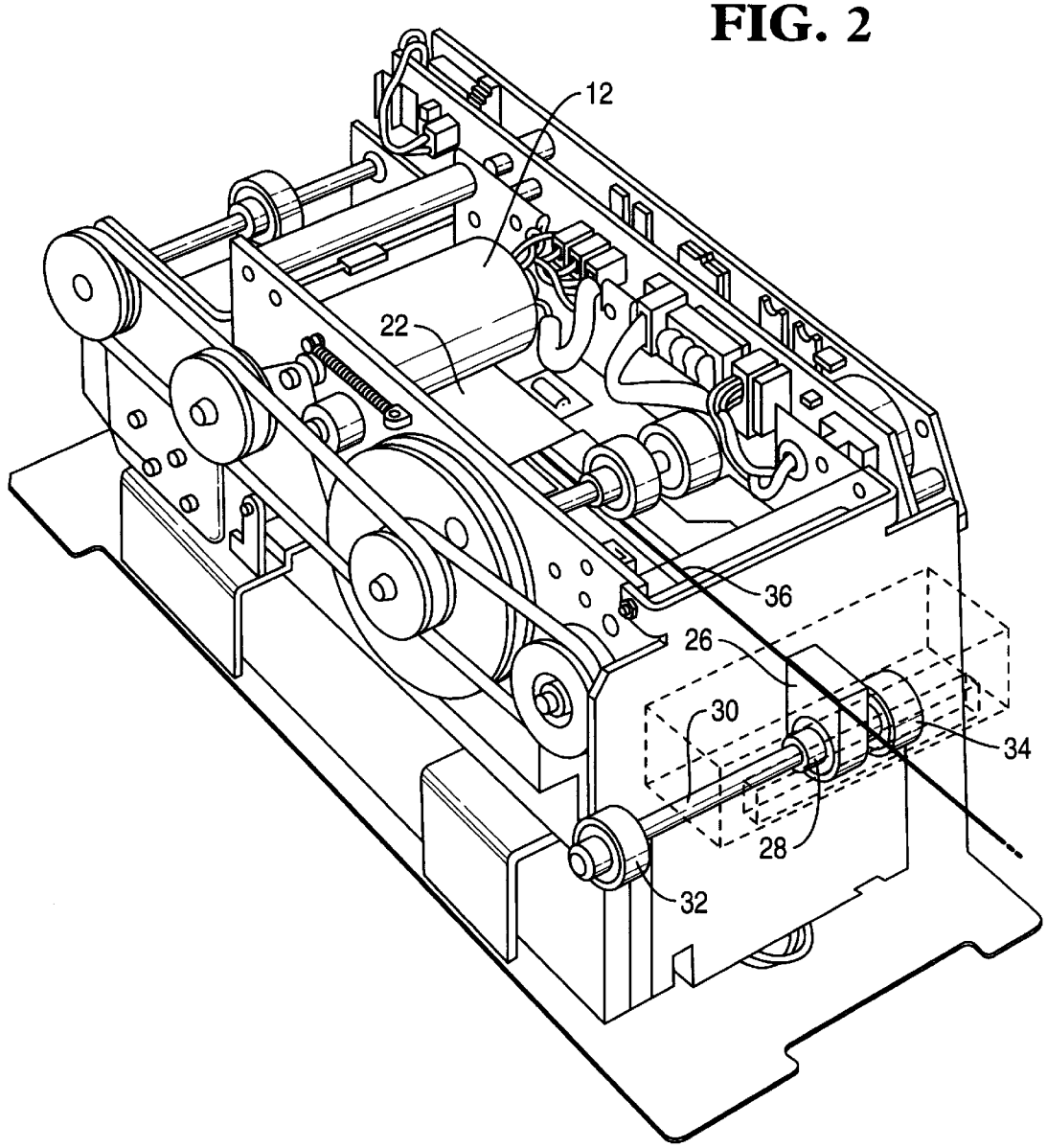
FIG. 2 is a partially cut-away perspective view of a card reader similar in nature to that of FIG. 1 but embodying the present invention.

FIG. 2 illustrates a card reader 36 having a similar overall arrangement to that illustrated in FIG. 1 but which includes one embodiment of the present invention for preventing fraud such as that illustrated with reference to FIG. 1.

Like parts are identified by similar reference numerals to those employed in FIG. 1 but it will be appreciated that the mouth region 14 is shown cut-away so as to reveal the features employed within an embodiment of the present invention.

The illustrated embodiment of the present invention comprises a laser inferometer 26 which is mounted on a precision-rolled thread ball screw 28 itself mounted on a threaded shaft 30. The threaded shaft 30 is mounted between a stepper motor 32 and a bearing 34 and is caused to rotate under the control of the stepper motor 32. As will be appreciated, in view of the cooperation of the outer thread of the shaft 30 and the inner thread of the precision-rolled thread ball screw 28, the laser inferometer 26 can move along the length of the shaft 30 in either of the directions indicated by arrows A.

Also, the shaft 30 extends transversely across the delivery path for a card passing through the mouth region 14 and the laser inferometer 26 is therefore movable across, and below, the aforementioned delivery path.

For use in association with the laser inferometer 26 there is provided an elongate reflector plate 36 which extends across, and above, the aforesaid delivery path of a card and which has a longitudinal axis parallel to the axis rotation of the shaft 30.

The laser beam emitted from the laser inferometer 26 therefore travels upwardly (in accordance with the orientation shown in FIG. 2) towards the reflector plate 36 from where it is reflected back to the inferometer 26. The originating laser beam, and its reflected counterpart, therefore travel through the aforementioned delivery path of the card 22.

Figure 3:
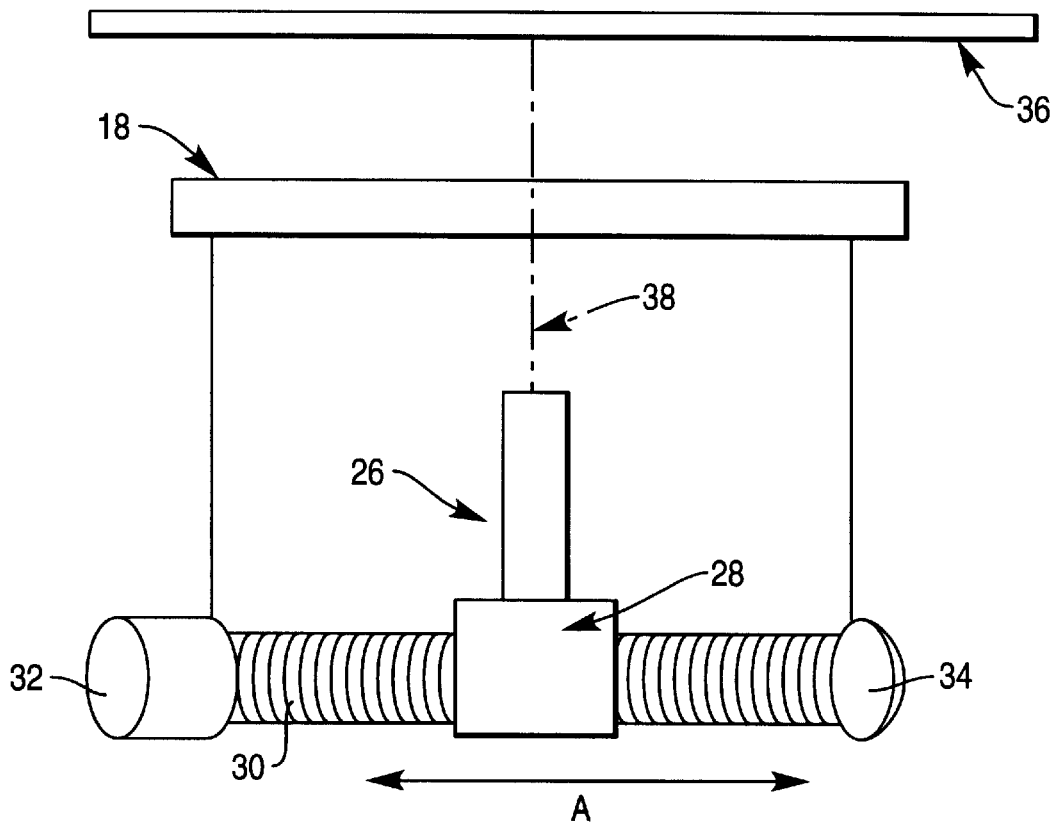
FIG. 3 is a schematic representation of one particular embodiment of a signal source/detector arrangement of the present invention.

As indicated by the arrows A, the laser beam can be swept across the aforesaid delivery path and this is illustrated further in FIG. 3, which is a schematic illustration of the laser inferometer arrangement illustrated in FIG. 2 and shows its relationship with the slot 18 serving to define the delivery path of a card.

In FIG. 3, the laser beam 38 is illustrated in its passage between the laser inferometer 26 and the reflector plate 36 and, again, with reference to arrows A, it will be appreciated how the laser beam 38 can be swept across the full lateral extent of the slot 18 so as to cover the full width of the delivery path.

The inferometer measures the wave amplitude reflected back from the reflector plate 36 and which is of known value. The presence of any foreign objects, such as the thread 24 illustrated in FIGS. 1 and 2, will be detected by the laser inferometer in view of the interference with the laser beam which will lead to a different wave form amplitude and the accuracy of this arrangement is such that a foreign object having dimensions of merely 1 Tm can easily be detected.

Figure 4:
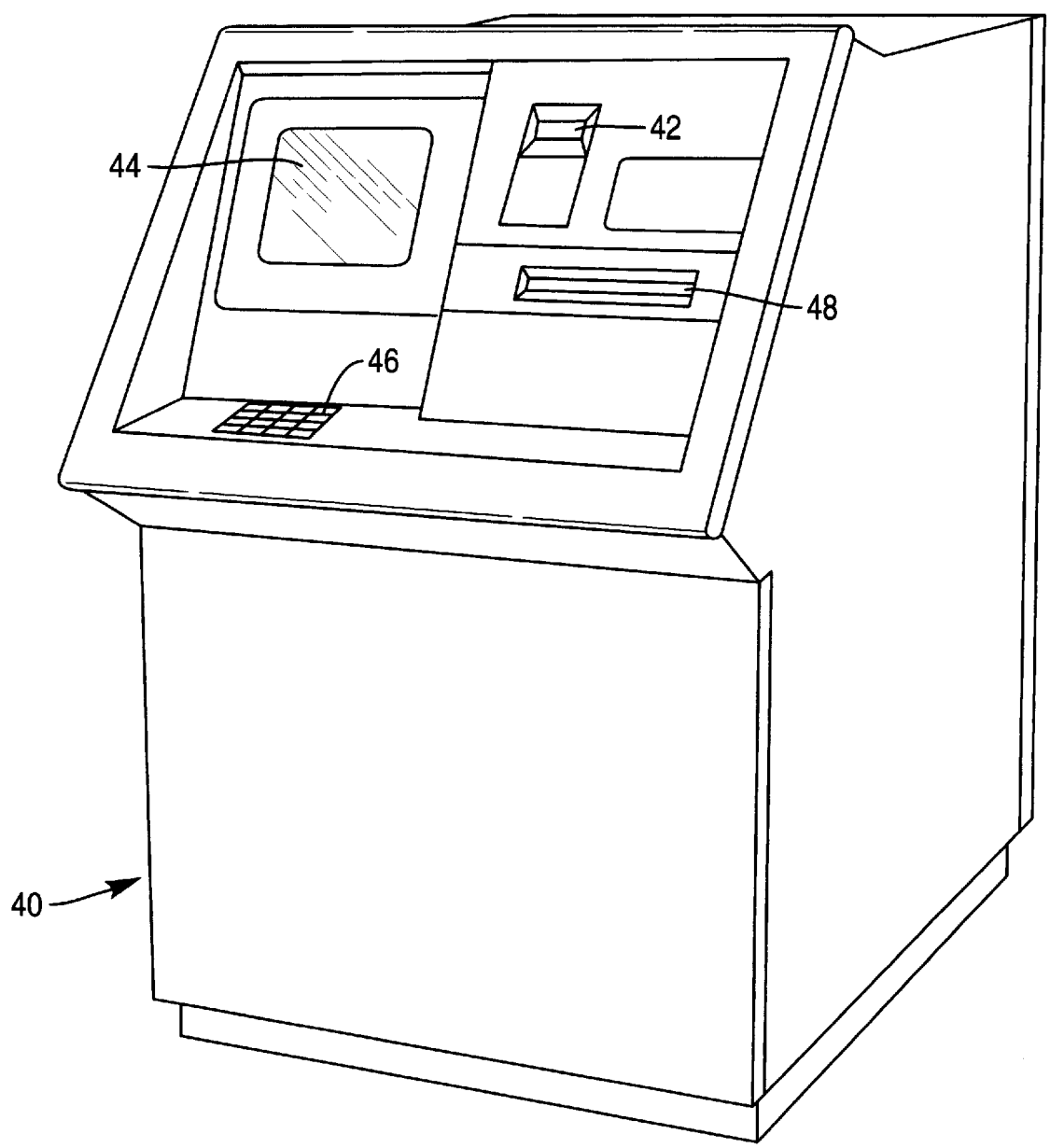
FIG. 4 is a perspective view of an ATM incorporating a card reader embodying the present invention.

FIG. 4 shows an automated teller machine 40 having a magnetic card input slot 42, a screen display 44, a keypad 46, and a cash delivery slot 48 and which is advantageously arranged for use in combination with a card reader according to the present invention.

Figure 5:
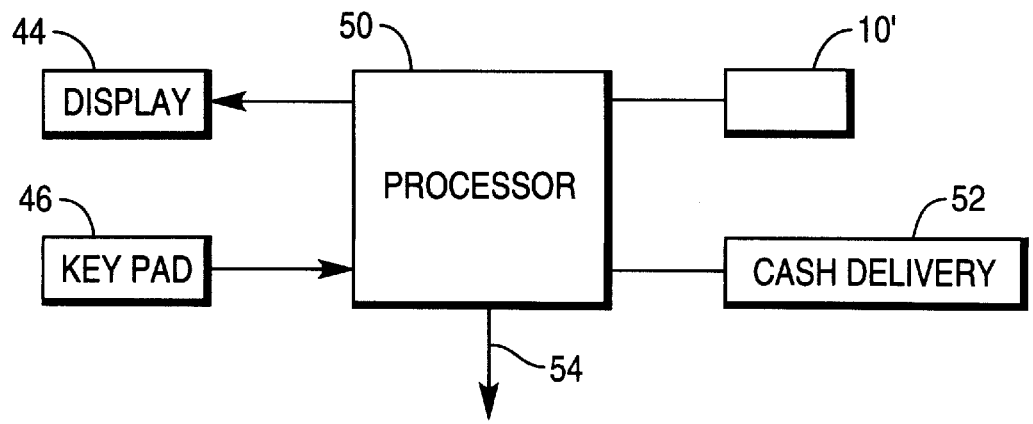
FIG. 5 is a block diagram illustrating a control system for the ATM of FIG. 4.

The control system for the automated teller machine 44 is illustrated as a block diagram in FIG. 5 in which a processor 50 is connected to receive an input from the keypad 46 in order to control the display 44 and also to control a cash counting and delivery system 52 connected to the cash delivery slot 48. A card reader 10' according to the invention is also connected to the processor 50 which, in turn, is connected via connection 54 to the central authorization system of the financial institution operating the automated teller machine 40.

As will be appreciated from the aforementioned FIGS. 2–5, should a user of the automated teller machine attempt a fraud by manipulating movement of the card within the card reader by means of a thread extending along the delivery path and out through the throat region, the detector arrangement will advantageously serve to identify the presence of such a thin foreign object. An appropriate response signal can advantageously then be generated which can serve to not only prevent any further attempted fraudulent use of the self-service terminal but may also be used to initiate some form of alarm generation procedure.

The invention is not restricted to the details of the aforementioned embodiment. For example, the card reader can be employed in any appropriate self-service terminal employing some form of data carrier to be inserted into the terminal and, further, the signal source detector arrangement can be provided in any appropriate orientation relative to the delivery path of the data carrier to be introduced thereto. In particular, rather than sweeping a signal across the path, the signal can comprise a composite signal generated by an array of signal sources extending across the path.

What is claimed is:

1. A card reader comprising:
   card receiving means for receiving a card having stored data to be read;
   card reading means for reading the stored data;
   means for delivering a card received at the card receiving means to the card reading means via a delivery path;
   a signal source for providing an output signal to be directed across the complete width and height of the path; and
   a receiver for receiving the output signal and detecting the presence of an object in the path in response to the object interfering with the signal.

2. A card reader according to claim 1, wherein the output signal is swept across the path.

3. A card reader according to claim 1, wherein the signal source is movably mounted relative to the path.

4. A card reader according to claim 3, wherein both the signal source and the receiver are disposed on a common mount such that any movement of the mount leads to equal movement of the signal source and the receiver.

5. A card reader according to claim 3, further comprising a stepper motor for controlling movement of the signal source across the delivery path.

6. A card reader according to claim 1, wherein both the signal source and the receiver are located on the same side of the delivery path, and further comprising reflecting means for reflecting the signal from the signal source for receipt by the receiver.

7. A card reader according to claim 1, wherein the signal source and the receiver comprise appropriately matched electro-optic devices.

8. A card reader according to claim 7, wherein the signal source and the receiver comprise a laser inferometer.

9. A self-service terminal comprising:

card input means for receiving a card having stored data to be read;

card reading means for reading the stored data; and a card reader for delivering the card received at the card input means to the card reading means via a delivery path, the card reader including (i) a signal source for providing an output signal to be directed across the complete width and height of the path, and (ii) a receiver for receiving the signal and for detecting the presence of an object in the delivery path in response to the object interfering with the signal.

10. A card reader comprising:

an inlet slot for receiving a card having data magnetically stored therein;

means for reading said stored data from said card;

means for delivering said card to said reading means along a delivery path; and means for detecting a foreign object attached to said card and extending through said slot, said detecting means being effective for sweeping a signal across the full lateral extent of said slot to cover the full width of said delivery path.

11. A reader according to claim 10 wherein said detecting means comprise:

a laser threadingly mounted to a shaft disposed across said width of said delivery path; and a motor operatively joined to said shaft for moving said laser therealong to sweep a laser beam from said laser to form said signal across said delivery path.

12. A reader according to claim 11 wherein said detecting means further comprise a receiver operatively aligned with said laser for measuring amplitude of said laser beam emitted therefrom for detecting said foreign object interrupting said laser beam.

13. A reader according to claim 12 wherein said laser and receiver collectively define a laser inferometer threadingly mounted to said shaft on one side of said path, and a reflector is mounted on an opposite side of said path for reflecting said laser beam back to said inferometer.

14. A reader according to claim 13 wherein said motor is a stepper motor for accurately driving said inferometer along said shaft.

15. An automated teller machine comprising:

an inlet slot for receiving a card having data magnetically stored therein;

a screen display, keypad, cash delivery slot, and a control system operatively joined together to provide financial services upon reading said data from said card;

means for reading said stored data from said card;

means for delivering said card to said reading means along a delivery path; and means for detecting a foreign object attached to said card and extending through said slot, said detecting means being effective for sweeping a signal across the full lateral extent of said slot to cover the full width of said delivery path.

16. A machine according to claim 15 wherein said detecting means comprise:

a laser threadingly mounted to a shaft disposed across said width of said delivery path; and a motor operatively joined to said shaft for moving said laser therealong to sweep a laser beam from said laser to form said signal across said delivery path.

17. A machine according to claim 16 wherein said detecting means further comprise a receiver operatively aligned with said laser for measuring amplitude of said laser beam emitted therefrom for detecting said foreign object interrupting said laser beam.

18. A machine according to claim 17 wherein said laser and receiver collectively define a laser inferometer threadingly mounted to said shaft on one side of said path, and a reflector is mounted on an opposite side of said path for reflecting said laser beam back to said inferometer.

19. A machine according to claim 18 wherein said motor is a stepper motor for accurately driving said inferometer along said shaft.

20. A machine according to claim 19 wherein said laser inferometer is operatively joined to said control system to prevent fraudulent use of said automated teller machine upon detection of said foreign object.

* * * * *